United States Patent [19]

Okamura et al.

[11] 3,903,368

[45] Sept. 2, 1975

[54] TELEPHONE AUTOMATIC ANSWERING DEVICE WITH PLURAL MESSAGE RECORDERS

[75] Inventors: Akira Okamura; Shizuo Ando; Tateki Ueda, all of Tokorozawa, Japan

[73] Assignee: Pioneer Electronic Corporation, Tokyo, Japan

[22] Filed: June 7, 1973

[21] Appl. No.: 367,929

[30] Foreign Application Priority Data

June 7, 1972 Japan ............................... 47-56733

[52] U.S. Cl. ........................ 179/6 R; 179/100.1 DR

[51] Int. Cl.$^2$ .......................................... G11B 15/06

[58] Field of Search... 179/6 R, 6 C, 6 E, 100.1 DR, 179/100.4 PT

[56] References Cited

UNITED STATES PATENTS

| | | | |
|---|---|---|---|
| 3,086,086 | 4/1963 | Ernst et al. | 179/100.4 PT |
| 3,293,365 | 12/1966 | Mitsui | 179/6 E |
| 3,328,536 | 6/1967 | Bolick, Jr. | 179/6 E |

*Primary Examiner*—Terrell W. Fears
*Assistant Examiner*—David K. Moore
*Attorney, Agent, or Firm*—Sughrue, Rothwell, Mion, Zinn & Macpeak

[57] ABSTRACT

A telephone automatic answering device includes a plurality of recording sections each with a magnetic tape, and a novel select mechanism which operates when the magnetic tape loaded in an operating recording section comes to the end to transfer a continuously incoming caller's message to another stand-by recording section following termination of operation of the first recording section.

1 Claim, 3 Drawing Figures

TELEPHONE AUTOMATIC ANSWERING DEVICE WITH PLURAL MESSAGE RECORDERS

BACKGROUND OF THE INVENTION

1. Field of the Invention

This invention relates to a telephone automatic answering device and, more particularly, to a device which responds to an incoming call signal from a telephone line to send out a previously recorded answering message through the telephone line and to record a caller's message incoming through the telephone line.

2. Description of the Prior Art

Telephone automatic answering devices of the above type are widely used for telephone sets which are not watched by an owner, telephone sets which are used only for receipt of business orders, and the like. However, because only a single magnetic tape could be loaded in one such prior art device, the total recordable time was quite short. Further, such a conventional device has drawbacks wherein a previously recorded caller's message cannot be reproduced or played back while the device is recording a new incoming message, and wherein the recording operation cannot be performed during the reproducing or playback operation.

SUMMARY OF THE INVENTION

It is an object of the present invention to overcome the above drawbacks of conventional telephone automatic answering devices.

It is a specific object of the present invention to provide a telephone automatic answering device which can continuously record a caller's incoming message without any limitation on the recording time and simultaneously reproduce a recorded caller's message while the recording operation is taking place.

According to the present invention, a plurality of recording sections each for recording a caller's incoming message are provided in a single answering section of a telephone automatic answering device, and a select mechanism is provided to select one of the recording sections in order to record the caller's message incoming through a telephone line. When the magnetic tape loaded in the operating recording section comes to its end, the select mechanism operates to change an electric connection so that the incoming caller's message is recorded in another recording section without substantial interruption, whereby a continuous recording operation can take place. In a modification, while one recording section is in the recording state another recording section can be put in the reproducing or playback state in order to permit hearing of an already recorded message, whereby a continuous recording operation without time limitation can take place through successive operations of the plural recording sections.

DESCRIPTION OF THE PREFERRED EMBODIMENT

Figure 1:
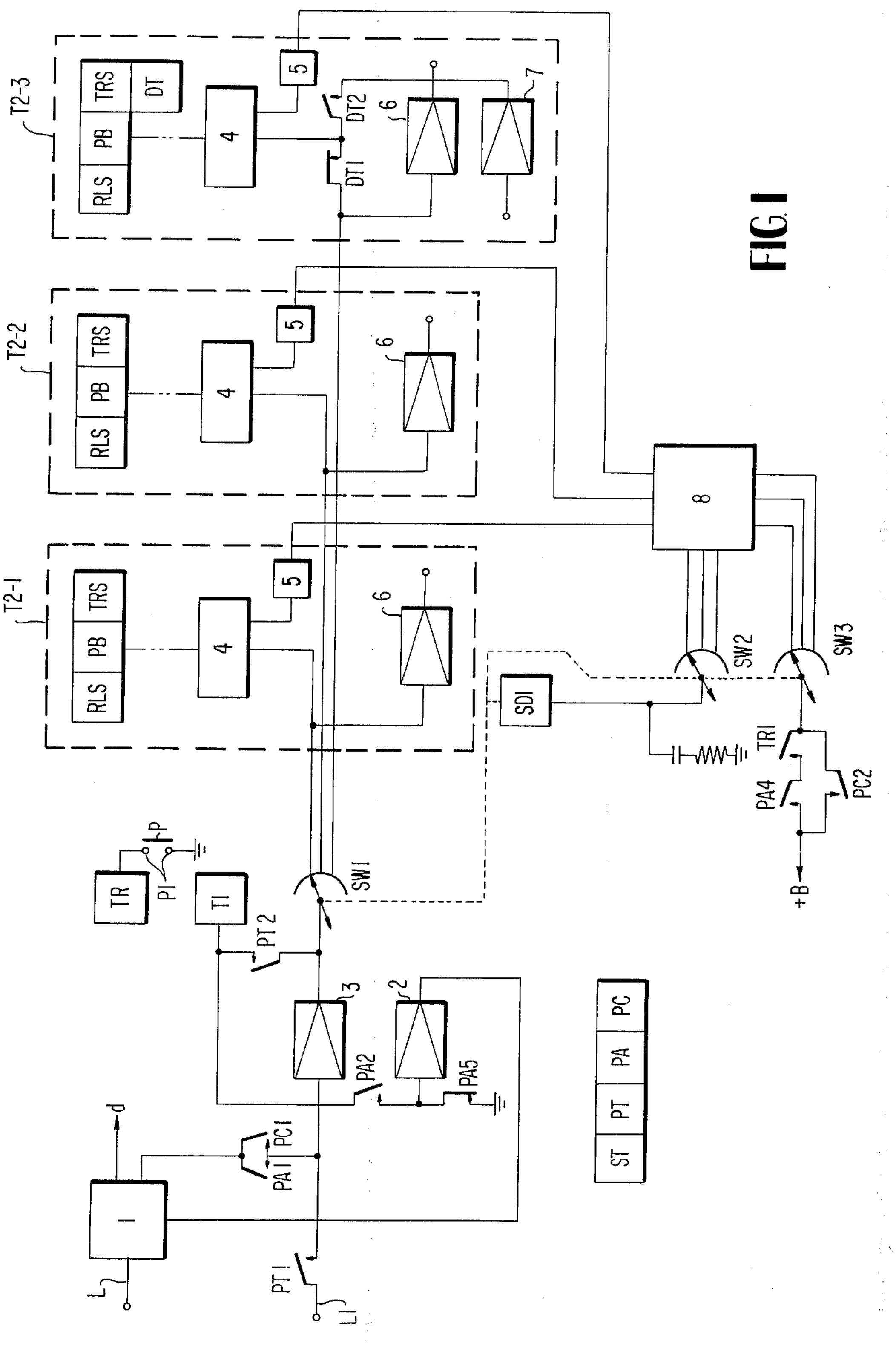
FIG. 1 is a schematic block diagram of one embodiment of a telephone automatic answering device according to the present invention.

Referring to FIG. 1, a control mechanism adapted to be coupled to a telephone line is designated by reference number 1. The control mechanism 1 including a matching transformer, a timer, a start control circuit and a voice operation circuit (not shown), is actuated when an incoming call signal, i.e. a ringing or bell signal, appears continuously on the telephone line L for a predetermined time period to cause the telephone line to be maintained in the talking or communication state for a time duration previously set in the timer of the control mechanism.

Figure 2:
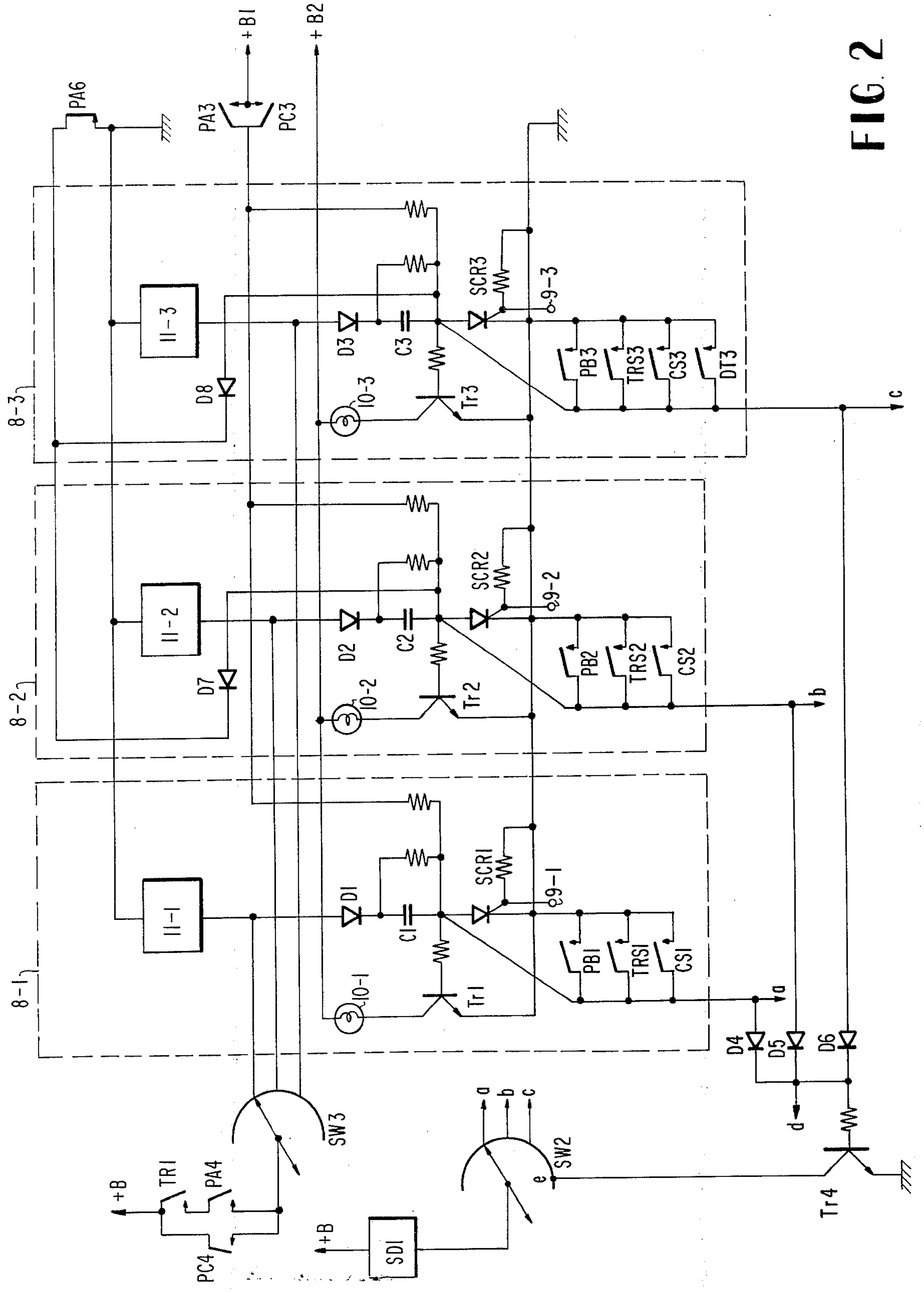
FIG. 2 is an electric circuit diagram of a select mechanism employable in the device shown in FIG. 1.

At the same time that the telephone line is changed to the talking state, an answering tape recorder T1 wherein an answer message is previously recorded is operated to send out through the control mechanism and to the telephone line a previously recorded answer message after amplification by a playback amplifier 2. The answer message informs the caller that the receiving telephone set is managed by a telephone automatic answering device which has the ability of recording a caller's desired incoming message. The above operation is conducted if an auto-answering push button PA is depressed so as to close four normally open contacts PA1 through PA4 and open two normally closed contacts PA5 and PA6, as shown in FIGS. 1 and 2.

The magnetic tape used in the answering tape recorder T1 is preferably of the endless type. Thus, when the tape approaches its end, a conductive foil P short-circuits a pair of contacts P1 to energize a relay TR. The relay TR closes its normally open contact TR1 when it is energized.

On the other hand, the incoming signal from the telephone line L passes through the matching transformer included in the control mechanism and the now closed contact PA1 and is applied to a recording amplifier 3. After being amplified, the signal passes through a select switch SW1 and is supplied to the selected one of a plurality of recording sections T2-1, T2-2 and T2-3. The select switch SW1 is driven by a solenoid SD1 together with two other select switches SW2 and SW3 in an interlinked manner. The solenoid SD1 is controlled by a select mechanism 8 hereinafter described.

Each recording section T2-1, T2-2 or T2-3 includes a recording reproducing mechanism 4 for recording a signal from the recording amplifier 3 on a magnetic tape, such as a cassette tape, and also for reproducing an already recorded voice signal, and a tape end detecting mechanism 5 to detect the fact that the magnetic tape has come to its end and, upon such detection to generate a signal, such as a positive D.C. voltage in the illustrated embodiment. There is also provided in each recording section a reproducing or playback amplifier 6 to amplify a previously recorded voice signal when it is reproduced. The above operation is selected by depressing a playback push button PB, or a transcription push button TRS, or a release button RLS. It should be noted that an independently operable recording amplifier 7 is provided in only the third recording section T2-3 in the illustrated embodiment in order to give to the automatic answering device the same function as that of a general use tape recorder which has no connection with the telephone set, thereby permitting the device also to function as a general use tape recorder. For such use, the recording amplifier 7 will be connected to the recording mechanism 4 in place of the recording amplifier 3 when a recording button DT is depressed to change over its interlinked normally closed contacts DT2 and normally open contacts DT2 so that contacts DT1 are opened and contacts DT2 are closed.

The output of each of the tape end detecting mechanisms 5 is applied to the select mechanism 8 to energize the solenoid SD1 thereby to control the contact positions of the aforementioned select switches SW1 through SW3. It will be noted that a push button PT, if depressed, closes its normally open contacts PT1 and PT2 to cause the answer message to be recorded in the tape recorder T1; a push button PC, if depressed, switches its contact within the control mechanism 1 to couple the signal circuit of the telephone line to the automatic answering device and also closes its normally open contacts PC1 through PC4 to cause the caller's incoming voice message to be recorded in one of the recording sections T2-1, T2-2 and T2-3; and a push button ST functions to release the push buttons PT, PA and PC.

FIG. 2 shows an exemplary detailed circuit arrangement of the select mechanism 8. In the drawing, the select mechanism includes control sections 8-1, 8-2 and 8-3 corresponding to the recording sections T2-1, T2-2 and T2-3, respectively. The first control section 8-1 has an input terminal 9-1 to which the output of the tape end detecting mechanism 5 of the first recording section T2-1 is connected, and this input terminal 9-1 is connected to the gate of a thyristor SCR1. When the signal (in the illustrated embodiment, a positive D.C. voltage) from the tape end detecting mechanism 5 is not supplied to the gate of thyristor SCR1, the thyristor SCR1 is in the off state. In this state, if the contacts PB1, TRS1 and CS1, each coupled across the anode of the thyristor SCR1 and the ground, are all open, a transistor $T_r1$ is in the on state and causes an indicator lamp 10-1 to turn on.

It will be understood that the contact PB1 is open if the push button PB in the recording section T2-1 is not depressed; the contact TRS1 is open if the push button TRS is not depressed; and the contact CS1 is open if no magnetic tape is loaded in the recording section T2-1.

Now, assume that the select switch SW3 is in its first position where the circuit is connected to the first recording section T2-1. Then, when the answering operation of the answering tape recorder T1 has been completed, the contact TR1 is closed, and a relay 11-1 is energized so that the recording section T2-1 changes to its recording operation state. Because the select switch SW1 is also in the first position under the above condition, the caller's incoming voice message transmitted from the telephone line L is supplied through the control mechanism 1, the contact PA1, the recording amplifier 3 and the select switch SW1 to the recording-reproducing mechanism 4 where it is recorded on the magnetic tape loaded therein.

On the other hand, electric current supplied from the power source +B through the select switch SW3 flows through a diode D1 and a capacitor C1, and is applied to a first fixed contact of the select switch SW2. The moving arm of the select switch SW2 is coupled to the power source +B through the solenoid SD1 which rotates, one step at a time, the moving arm of each of the select switches SW1 through SW3. However, because the first fixed contact *a* with which the above moving arm is in contact is supplied with the voltage from the power source +B, no current flows through the solenoid SD1; thus, the moving arms are held in the position of the first fixed contact.

Second and third control sections 8-2 and 8-3 have the same arrangement as that of the first control section 8-1 wherein elements of the second and third control sections corresponding to those of the first control section bear the same reference numbers except that each second occurring number is change from "1" to "2" or "3", so, no further explanation will be given here. Out of the three control sections, only the third control section 8-3 has a contact DT3 coupled across the contacts PB3, TRS3 and CS3. This contact DT3 is closed when the push button DT is depressed.

As recording operation of the caller's message is repeated, and when the magnetic tape loaded in the first recording section T2-1 comes to its end, the tape end detecting mechanism 5 detects the end-of-tape state and supplies a positive D.C. voltage through the input terminal 9-1 to the gate of thyristor SCR1 to thereby turn on the thyristor. Thus, the anode potential of the thyristor SCR1 falls, the relay 11-1 changes to the de-energized state, and the transistor Tr1 turns off to turn off the indicator lamp 10-1. Also, because the potential at the first fixed contact *a* of the select switch SW2 connected to the anode of the thyristor SCR1 falls, current flows through the solenoid SD1 to advance one step the moving arm of each of the select switches SW1 through SW3 thereby to shift each moving arm to the corresponding second fixed contact position *b.*

The same operation as the foregoing operation also occurs if any one of the contacts PB1, TRS1 and CS1 is closed. That is, each moving arm is shifted out of the first fixed contact position into the reproducing state when the push button PB is depressed, when the transcription push button TRS is depressed, or when no magnetic tape is loaded into the recording section.

When the second recording section T2-2 is in the recording state, that is, when all the contacts PB2, TRS2 and CS2 are open and no signal is supplied from the tape end detecting mechanism 5 to the input terminal 9-2, the positive D.C. voltage is applied to the second fixed contact *b* of the select switch SW2, so that the moving arm which has engaged this fixed contact is maintained in engagement with that contact due to the solenoid SD1 having become de-energized. Therefore, when the contact TR1 is closed, the relay 11-2 changes to the energized state due to the current supplied through the select switch SW3, and the caller's message applied through the select switch SW1 to the recording-reproducing mechanism 4 is recorded by means of the second recording section T2-2. Because the above switchover operation occurs rapidly, for example, within a time period of 1 to 2 seconds, the portion of the caller's message which may not be recorded is very short even if the caller's message continues while the above switchover operation takes place.

The foregoing switchover operation is also performed when the magnetic tape loaded in the second recording section comes to the end, and, thereafter, recording is started by means of the third recording section T2-3. In this way, recording of the caller's message can be carried out successively by the first, second and third recording sections T2-1, T2-2 and T2-3.

When it is desired to reproduce the recorded caller's message, the playback push button PB is depressed which corresponds to one, for example, the second recording section T2-2, out of the three recording sections T2-1 through T2-3. In response to depression of the playback push button PB, the recording-reproducing mechanism 4 effects the reproducing operation, and the resulting reproduced signal is, after being amplified by the playback amplifier 6, heard through earphones or loud-speakers. Further, by depressing the push button PB, the contact PB2 is closed, and the anode of the thyristor SCR2 is connected to the ground. Thus, the potential at the second fixed contact *b* of the select switch SW2 falls, so that, even if its moving arm comes to that contact position, it is caused to move toward the next fixed contact position *c*. That is, if one or more of the recording sections T2-1 through T2-3 is in the non-recording state, the select switches SW1 through SW3 are advanced step by step until their moving arms come to the position corresponding to any one of the recording sections T2-1 through T2-3 which is in the recording state.

The anodes of the thyristors SCR1 through SCR3 are connected through respective diodes D4 – D6 to the start circuit of the control mechanism 1 and to the base of a transistor Tr4. The transistor Tr4 has its collector connected to the fourth fixed contact *e* of the select switch SW2 and an emitter connected to ground. Thus, if at least one of thyristors SCR1 through SCR3 is off, the potential at the fourth fixed contact *e* of the select switch SW2 is kept at a high level and, thus, when the moving arm engages contact *e*, it is rotated toward the first fixed contact *a*. Further, if all the thyristors SCR1 through SCR3 are on, the cathode potential of each of the diodes D4 through D6 falls; then the start control circuit of the control mechanism 1 is changed to the inoperative state, and the automatic answering device will not respond to the following incoming call signal.

To facilitate listening to the message recorded on the magnetic tapes loaded in the recording sections T2-1 through T2-3, it is desirable to provide a foot switch unit and solenoids which are controlled by the foot switch unit to initiate playback and tape-rewind operations. In this case, a remote control will take place by use of the foot switch unit while the transciption push button TR is depressed. Even during the playback operation, if any one of the indicator lamps 10 is on to indicate that the corresponding recording section T2-1, T2-2 or T2-3 is in the recordable state, it is possible to continue recording of the incoming message.

After the whole message recorded in the recording sections T2-1 through T2-3 is heard, the release button RLS will be depressed to release the playback push button PB and the transcription push button TRS to return them to their undepressed positions. Then, if the push button PA is depressed, the automatic answering device changes to the stand-by state, so the device can respond to the next incoming call to start the automatic answering operation.

Contact PA6 is provided to control the select switches SW1 through SW3 in such a manner that if the push button PA is released to cancel the automatic answering operation state and then depressed again, the recording operation can always be started from the first recording section T2-1. This contact PA6 is a normally closed contact interlinked with the push button PA in the illustrated embodiment (this contact can also be realized in the form of a normally open contact which is independently operable), and closes if the push button PA is released to connect the anodes of the thyristors SCR2 and SCR3 through diodes D7 and D8, respectively, to the ground. If the moving arms of the select switches SW1 through SW3 are in the first fixed contact position, the potential at the anode of the thyristor SCR1 is high, and the potential at the first fixed contact *a* of the select switch SW2 is also high, so that all the moving arms are held where they are. However, if the moving arms are held in positions other than the above positions, for example, in the second fixed contact positions, the moving arms move toward the third fixed contact positions because the potential at the second fixed contact position *b* of switch SW2 is low, and then they move toward the fourth fixed contact positions. Further, because the potential at the anode of the thyristor SCR1 is high and, thus, the transistor Tr4 is on, the potential at the fourth fixed contact position *e* is low, as a result, all the moving arms move up to the first fixed contact positions and stop there. In this way, after the push button PA is released once and then depressed again, recording of the message to be recorded is always effected in the first recording section T2-1.

Figure 3:
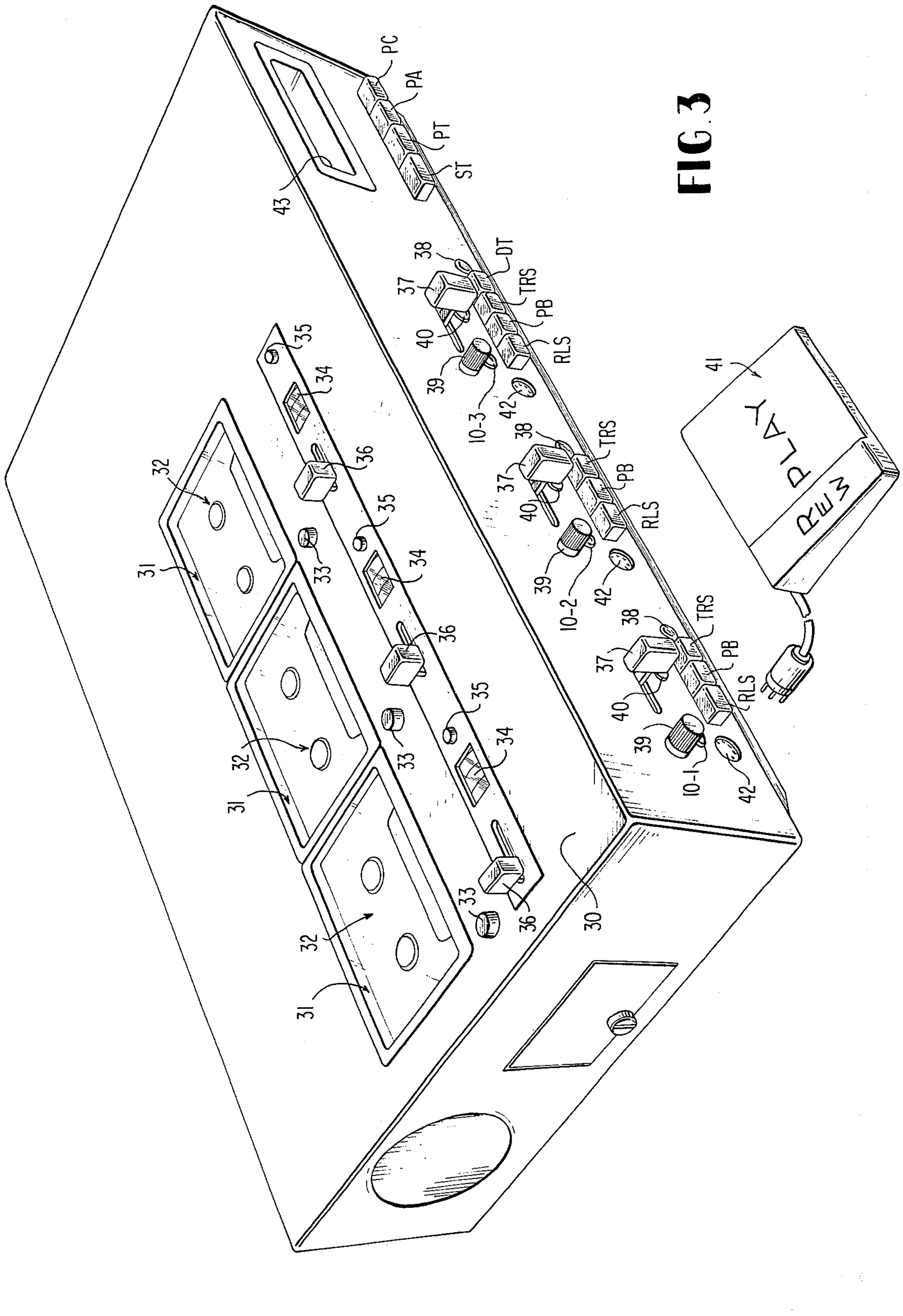
FIG. 3 is an external perspective view of the device.

FIG. 3 shows a preferred embodiment of the external feature of a telephone automatic answering device including the aforementioned various parts. The device has a case 30 accommodating the three recording sections T2-1 through T2-3, in the upper portion of which case are provided three tape receptacles 31, corresponding to the recording sections T2-1 through T2-3, and each accepting a tape cassette 32. In front of each of the tape receiving receptacles 31 there are provided an eject button 33 for ejecting the cassette, a tape counter 34, a reset button 35 and a fast-feed eraser lever 36.

Further, on the front face of the case 30, there are provided, for each of the recording sections T2-1 through T2-3, push button RLS, PB and TRS to control the recording-reproducing mechanism, a rewind-fast-feed lever 37, an earphone jack 38, a tone volume control 39, an operation indicator lamp 40, the aforementioned indicator lamps 10-1 through 10-3 to indicate the recordable standby state, and a connector 42 to which the foot switch unit 41 may be connected. On the right side of the front face there are provided an insertion port 43 through which the cartridge tape having the answering message recorded thereon is inserted, and the four pushbuttons ST, PT, PA and PC. According to the foregoing arrangement, the improved telephone automatic answering device can be constructed compactly and can be easily and accurately operated.

Though the embodiment described herein includes three recording sections, it should be understand that the number of the recording sections can be selected freely, if it is more than one, without affecting the desired function noted hereinabove.

We claim:

1. In an automatic telephone answering device having a control mechanism responsive to an incoming call signal from a telephone line for maintaining the telephone line in the talking state and for establishing the timing of operation of said answering device, the improvement comprising:

an answering section for sending out a previously recorded answer message to the telephone line;

a plurality of recording sections selectively operable to record an incoming caller's message from the telephone line, each recording section comprising means for receiving a magnetic tape, each having means for reproducing the message recorded on its associated magnetic tape, and each comprising detector means for producing a control signal when its associated magnetic tape reaches its end;

switch means for selectively coupling the telephone line to said recording sections; and selector circuit means operable, when a magnetic tape loaded in the tape-receiving means of the presently operating recording section comes to its end, to operate said switch means to select another one of said recording sections to which the incoming message is then applied;

said selector circuit means comprising a plurality of normally OFF thyristors, each corresponding to a different one of said recording sections, means for applying the control signals to the control electrodes of the corresponding thyristors so that each thyristor turns ON only upon the application thereto of a control signal; and means coupling said thyristors to said switch means for coupling the telephone line to the recording section corresponding to the ON thyristor.

* * * * *